Nov. 30, 1965  P. J. DONNELLY  3,220,244
THRUST BEARING WEAR SENSING DEVICE
Filed Sept. 6, 1963
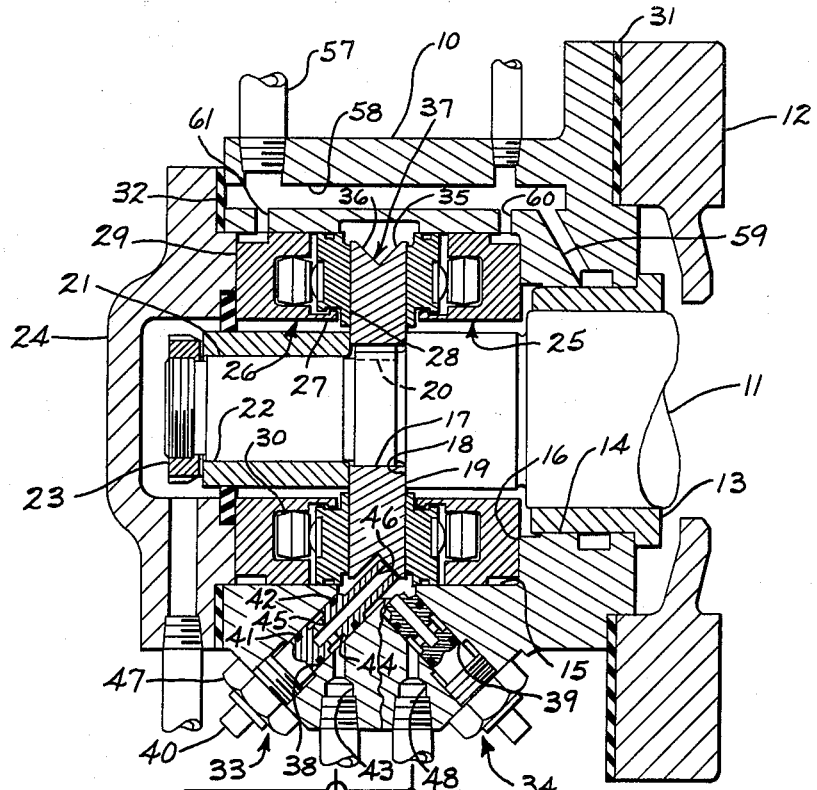
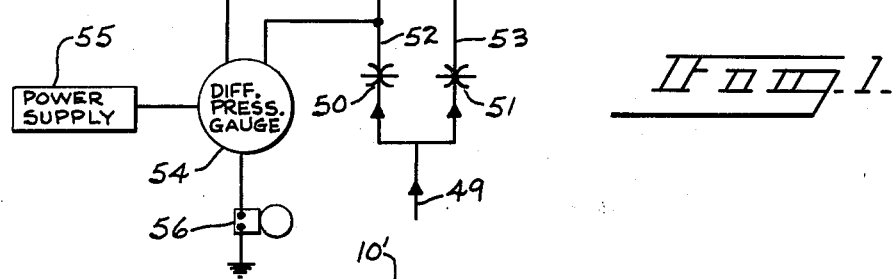
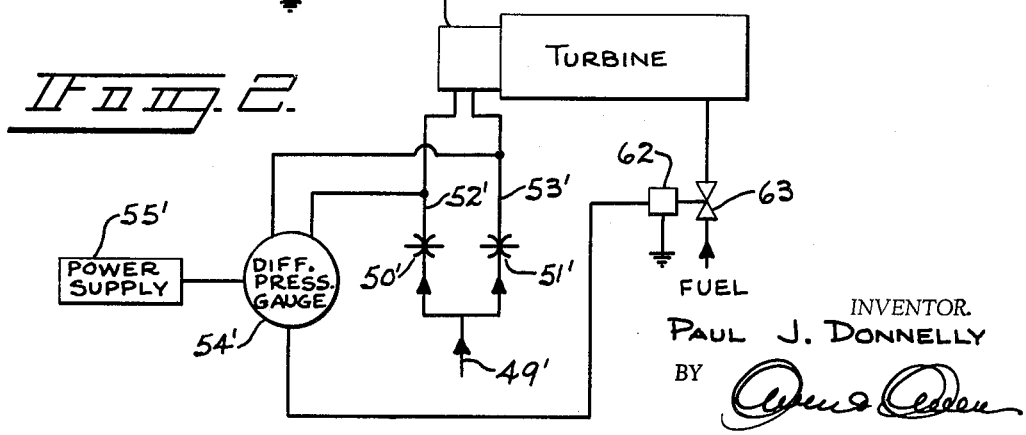
INVENTOR.
PAUL J. DONNELLY
BY
ATTORNEYS United States Patent Office 3,220,244
Patented Nov. 30, 1965

3,220,244
THRUST BEARING WEAR SENSING DEVICE
Paul J. Donnelly, Mount Vernon, Ohio, assignor to The Cooper-Bessemer Corporation, Mount Vernon, Ohio, a corporation of Ohio
Filed Sept. 6, 1963, Ser. No. 307,040
4 Claims. (Cl. 73—37.6)

The present invention relates to machines of the type having rotating shafts therein which are restrained against axial movement by suitable thrust bearing structures; and more particularly to means for sensing small axial displacements of the shaft.

Many types of machinery have rotating shafts which carry rotary structures having very precisely limited endwise clearance with respect to other structure. Turbo compressors and gas (or steam) turbines have rotors whose blades have very little axial clearance relative to stator parts which are carried by the machine housing. These rotors spin at a very high rate of speed, and severe damage occurs when the shaft of the engine shifts by an amount allowing the rotor stator parts to touch. The shafts of these turbines and compressors are held against axial displacement relative to the housing by means of closely fitting thrust bearing structures. Wear occurs in these thrust bearing structures after a period of time, and this wear must be detected and the clearance in the thrust bearing taken up before sufficient axial shifting of the shaft takes place to allow the blades of the rotors and stators to touch each other.

An object of the present invention, therefore, is the provision of new and improved means for accurately detecting an axial shifting of rotating structures while the rotating structures are in operation.

Another object of the invention is the provision of new and improved means for detecting small axial movements of rotating structures, which means is substantially unaffected by the speed of rotation of the rotating structure.

Another object of the invention is the provision of new and improved means for detecting axial movement of a rotor, which means is simple in design, rugged in construction, efficient in operation, and does not require the length of the shaft and housing of the machinery to be extended to accommodate the movement sensing means.

The invention resides in certain constructions, and combinations, and arrangement of parts, and further objects and advantages of the invention will become apparent to those skilled in the art to which the invention relates from the following description of the preferred embodiment described with reference to the accompanying drawing forming a part of this specification, and in which:

FIGURE 1 is a fragmentary sectional view through the thrust bearing structure of a centrifugal compressor, and showing somewhat diagrammatically the structure which is associated therewith for detecting axial movement of the compressor shaft; and FIGURE 2 is a diagrammatic view showing an embodiment of the invention arranged to shut down a gas turbine driven centrifugal compressor upon a predetermined amount of wear of its thrust bearing structure.

While the invention may be otherwise embodied, it is herein shown and described as embodied in the structure of a gas turbine driven centrifugal compressor. The structure of the centrifugal compressor shown in FIG. 1 comprises a generally annular thrust bearing housing 10 which surrounds one end of the rotatable shaft 11 of the centrifugal compressor, and which is bolted to the end of a main housing 12. The shaft 11 is journaled relative to the housing 12 by means of a sleeve bearing 13 which is positioned between the shaft 11 and the inner end of the thrust bearing housing 10.

Axial force of the shaft 11 which tends to cause movement relative to the housing 12 of the centrifugal compressor is prevented by thrust bearing structure housed within the annular thrust bearing housing 10. While any suitable thrust bearing structure may be used, the following described form is typical and has been found satisfactory. In this form, the central opening 14 of the annular thrust bearing housing 10 is slightly enlarged as at 15 outwardly of the sleeve bearing 13 to provide an outwardly facing shoulder 16. The shaft 11 is also reduced in diameter after passing outwardly of the sleeve bearing 13 and is further reduced in diameter as at 17 to provide an outwardly facing shoulder 18. An annular thrust bearing plate 19 is pressed over the reduced diameter section 17 of the shaft 11 and is caused to rotate with the shaft 11 by means of a key 20. The shaft 11 is further reduced in diameter as at 21 outwardly of the thrust bearing plate 19, and the thrust bearing plate is held against the shoulder 18 by a sleeve 22 and hold down nut 23 that is threaded to the end of the shaft 11. The outer end of the opening 15 in the thrust bearing housing 10 is closed off by an end plate 24 that is bolted to the end of the housing 10.

Axially inward movement of the shaft 11 relative to the main housing 12 is prevented by means of a complementary thrust bearing structure 25 that is positioned between the annular thrust bearing plate 19 and the shoulder 16. Similarly, axially outward movement of the shaft 11 relative to the main housing 12 is prevented by means of thrust bearing structures 26 that is positioned between the annular thrust bearing plate 19 and the end plate 24. The thrust bearing structures 25 and 26 are identical excepting that they are of opposite hand and so only one of the structures will be described.

The thrust bearing structure 26 comprises a plurality (usually six) of bearing plates or shoes 27 having flat bearing metal surfaces 28 which slide against the side surface of the annular thrust bearing plate 19. A retaining and back-up plate 29 is positioned on the opposite side of the shoes 27 from the thrust plate 19, and the back-up plate has axially extending projections, not shown, which engage the sides of each shoe 27 and prevent their rotation. A system of leveling plates 30 is provided between the shoes 27 and the back-up plate 29 to uniformly hold the shoes 27 against the annular thrust plate 19, as is well known in the art. The thrust bearing structure shown is of conventional construction and is commonly known as a Kingsbury thrust bearing.

The shaft 11 and the rotating structure that is attached thereto must be accurately positioned relative to the stationary vanes of the centrifugal compressor. Movement of the shaft 11 to the right as seen in FIG. 1 is prevented by the thrust bearing structure 25 and the limit of travel to the right is adjusted by the shims 31 placed between the thrust bearing housing 10 and the main housing 12. Movement of the shaft to the left as seen in FIG. 1 is prevented by the thrust bearing structure 26, and the limit of travel to the left is adjusted by the shims 32 placed between the end plate 24 and the thrust bearing housing 10.

Wear of the bearing metal surface 28 of the shoes 27 allows the shaft 11 to move relative to the housing 12. Only a predetermined amount of wear can take place, however, before the rotors and stators of the centrifugal compressor touch each other. According to the present invention, means are provided for continually sensing the position of the shaft 11 relative to the housing 12 while the centrifugal compressor is in operation. The means for sensing the position of the shaft 11 comprises a pair of nozzles 33 and 34 which discharge fluid against rotating surfaces 35 and 36, respectively, carried by the shaft 11 and which face generally in opposite axial directions. The surfaces 35 and 36 are surfaces of revolution and may be perpendicular to the shaft 11 or may be inclined somewhat, as shown in the drawing. In the preferred embodiment, the surfaces 35 and 36 are formed by a V-shaped groove 37 in the periphery of the annular thrust plate 19 so that the diameter of the thrust plate need not be increased to provide the necessary rotating surfaces. The nozzles 33 and 34 are received in bores 38 and 39 which extend at right angles to the surfaces 35 and 36, respectively. The nozzles 33 and 34 are otherwise identical and only one will be described in detail.

The nozzle 33 comprises a cylindrical body 40 having O-rings 41 and 42 in its outer surface positioned on opposite sides of a pressure fluid inlet connection 43. The cylindrical body 40 is provided with an annular recess 44 in its outer surface opposite the inlet connection 43, and fluid from the recess 44 is conducted to the end of the nozzle 33 by a transverse drilling 45 and longitudinal drilling 46. The nozzle 33 is threaded into the outer end of the bore 38 so that its end surface can be adjusted relative to the surface of the thrust plate 19 and can be locked in place by the lock nut 47. As previously indicated, the nozzle 34 is similar to the nozzle 33 and is supplied with pressure inlet fluid through the inlet connection 48. Any suitable pressure fluid, such as air, a gas or oil, can be used, and in the preferred embodiment a bearing lubricating oil is used. The lubricating oil from a supply line 49 at approximately 15 pounds per square inch pressure is supplied to two identical orifices 50 and 51. The orifices 50 and 51 supply equal rates of fluid flow to supply lines 52 and 53, respectively, which in turn conduct the flows to the inlet connections 43 and 48 of the nozzles 33 and 34, respectively. A differential pressure gauge 54 is connected to the supply lines 52 and 53 downstream of the orifices 50 and 51 to sense the difference in back pressure created by the nozzles 33 and 34.

When the centrifugal compressor is initially installed, the proper thickness of shims is installed at 31 and 32 to provide the proper axial running clearance between the rotor elements attached to the shaft 11 as the stator elements carried by the housing 12. With the shaft properly located in the housing 12, the nozzles 33 and 34 are adjusted to provide equal clearances with respect to the surfaces 35 and 36 of the thrust plate 19 so that no differential pressure is sensed by the gauge 54. Inasmuch as the surfaces 35 and 36 form an angle of about 45° with respect to the shaft 11, each of the nozzles 33 and 34 are provided with a clearance which is about 1.5 times the amount of clearance which is provided between the rotors and stators. This assures that the nozzles 33 and 34 do not touch the bearing plate 19 during the maximum allowable movement of the shaft 11. As wear of the surfaces 28 of the shoes 27 takes place, the shaft 11 will shift to decrease the clearance between the bearing plate 19 and one of the nozzles 33 and 34 while increasing the distance between the bearing plate 19 and the other of the nozzles 33 and 34. If the shaft should shift to the left, for example, the surface 35 moves closer to the nozzle 33 to increase the pressure in the supply line 52, while also increasing the distance between the surface 36 and the nozzle 34 to decrease the pressure in the supply line 53. This causes the differential pressure gauge to move in one direction from its zero position by an amount which indicates the shift in shaft 11. If the shaft 11 shifts to the right, the differential pressure gauge 54 will move in the opposite direction by an amount corresponding to the shift in the shaft 11.

The differential pressure gauge 54 shown in the drawing is of the type which is provided with a limit switch, not shown, which closes when the gauge 54 senses a predetermined pressure differential. In the system shown in FIG. 1 the limit switch is corrected in series with a power supply 55 and a warning buzzer 56 to sound an alarm when a predetermined amount of thrust bearing wear has taken place.

As has preveiously been indicated, the fluid which is supplied to the nozzles may in some instances be a gas, but in the preferred embodiment is a lubricating oil. The nozzles 33 and 34 may in some instances supply all of the oil required for the operation of the thrust bearing, but in the preferred embodiment shown in the drawing, the nozzles only supply part of the oil that is supplied to the thrust bearing. The remaining oil that is fed to the thrust bearing structure is supplied by means of the oil supply line 57. Oil flows from the supply line 57 into a longitudinal drilling 58 and then into lateral passages 59, 60 and 61 which weed the sleeve bearing 13, thrust bearing structure 25, and thrust bearing structure 26, respectively. An overflow, not shown, is supplied at the top of the bearing housing so that the thrust bearing is full of oil at all times.

The system shown in FIG. 2 is generally similar to that shown in FIG. 1, excepting that the system of FIG. 2 is arranged to shut down the gas turbine engine automatically, rather than sound an alarm. Those portions of FIG. 2 which are similar to corresponding portions of FIG. 1 are designated by a like reference numeral characterized further in that a prime mark is affixed thereto. The limit switch of the differential pressure gauge 54' is connected to detent solenoid 62 of a fuel shut-off valve 63 for the gas turbine engine. The shut-off valve 63 is spring biased closed and is held open by a suitable detent. When the solenoid 62 is energized by the differential pressure gauge 54', it releases the detent and allows the valve 63 to shut down the gas turbine engine. Other means of shutting down the engine can be used and actuated by the differential pressure gauge 54' as, for example, a by-pass valve on the turbine of the engine which diverts the gases from the turbine when the limit switch of the pressure gauge 54' is closed.

It will be apparent that new and improved means have been provided for accurately sensing the position of a rotating structure relative to its housing while the rotating structure is in operation.

While the invention has been described in considerable detail, I do not wish to be limited to the particular embodiment shown and described, and it is my intention to cover hereby all novel adaptations, modifications and arrangements thereof which come within the practice of those skilled in the art to which the invention relates.

What I claim is:

1. In machinery having rotatable elements, a housing, a shaft journaled in said housing, a thrust bearing between said shaft and said housing for restraining endwise movement of said shaft in opposite axial directions, said shaft having a pair of surfaces of revolution respective ones of which have at least a component which face generally in opposite axial directions, a pair of nozzles carried by said housing with the outlets of respective ones of said nozzles projecting generally normal to respective ones of said surfaces of revolution, means supplying a substantially constant flow of fluid to each of said nozzles, said surfaces of revolution restricting flow out of said nozzles to create a back pressure in said nozzles, and means for sensing the difference in back pressure in said nozzles.

2. In machinery having rotatable elements, a housing, a shaft journaled in said housing, a thrust bearing between said shaft and said housing for restraining endwise movement of said shaft in said housing, said shaft having a V-shaped groove extending around its periphery to form conical surfaces facing outwardly and in opposite axial directions, a pair of nozzles carried by said housing with the outlets of respective ones of said nozzles projecting generally normal to respective ones of said conical surfaces, means supplying a substantially constant flow of fluid to each of said nozzles, said conical surfaces restricting flow out of said nozzles to create a back pressure in said nozzles, and means for sensing the difference in back pressure in said nozzles.

3. The mechanism of claim 2 wherein said nozzles are adjustable toward and away from said conical surfaces.

4. In machinery having rotatable elements, a housing, a shaft journaled in said housing, a thrust bearing between said shaft and said housing for restraining endwise movement of said shaft in said housing, a radially extending flange fixed to said shaft for rotation therewith, said flange having a V-shaped groove extending around its periphery to form conical surfaces facing generally outwardly and in opposite axial directions, a pair of nozzles carried by said housing, each of said nozzles having an end surface to which a fluid flow passage communicates, respective ones of said end surfaces being positioned adjacent respective ones of said conical surfaces, a pair of conduits respective ones of which communicates with respective fluid flow passages of said nozzles, a pair of flow restricting means respective ones of which are positioned in respective ones of said conduits, means supplying substantially identical fluid pressure to each of said flow restricting means, and a differential pressure sensing instrument connected between said pair of conduits between said flow restricting means and said end surfaces of said nozzles to sense the difference in back pressure created by flow between said end surfaces of said nozzles and said conical surfaces.

References Cited by the Examiner
UNITED STATES PATENTS

| | | | |
|---|---|---|---|
| 2,684,568 | 7/1954 | Senger | 73—37.6 X |
| 2,839,071 | 6/1958 | Rosch | 137—16 X |
| 3,002,374 | 10/1961 | Jacobs | 73—37.5 |

ISAAC LISANN, *Primary Examiner.*